(12) United States Patent
Khan et al.

(10) Patent No.: US 7,542,241 B1
(45) Date of Patent: Jun. 2, 2009

(54) DISK DRIVE SUSPENSION WITH 1ST AND 2ND TORSION CONTROL THROUGH RAIL HEIGHT VARIATION AND OFFSETTING BEAM PORTION DEFLECTION

(75) Inventors: Amanullah Khan, Temecula, CA (US); Harry Wong, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 475 days.

(21) Appl. No.: 11/407,674

(22) Filed: Apr. 20, 2006

Related U.S. Application Data

(60) Provisional application No. 60/678,043, filed on May 4, 2005.

(51) Int. Cl.
G11B 5/48 (2006.01)
G11B 5/58 (2006.01)
(52) U.S. Cl. ................................... 360/244.9
(58) Field of Classification Search ............ 360/244.2, 360/244.9, 245.2
See application file for complete search history.

(56) References Cited

U.S. PATENT DOCUMENTS

| | | | | |
|---|---|---|---|---|
| 5,877,923 A | * | 3/1999 | Khan et al. | 360/244.9 |
| 5,894,381 A | * | 4/1999 | Allen et al. | 360/244.9 |
| 5,991,122 A | | 11/1999 | Tangren et al. | |
| 6,271,996 B1 | * | 8/2001 | Houk et al. | 360/244.9 |
| 6,341,050 B1 | | 1/2002 | Coon | |
| 6,369,986 B1 | | 4/2002 | Coon | |
| 6,751,065 B2 | * | 6/2004 | Smith et al. | 360/244.9 |
| 2003/0086207 A1 | * | 5/2003 | Watadani et al. | 360/244.9 |
| 2003/0202287 A1 | * | 10/2003 | Smith et al. | 360/244.9 |
| 2005/0117256 A1 | * | 6/2005 | McCaslin et al. | 360/244.9 |
| 2006/0227463 A1 | * | 10/2006 | Wright et al. | 360/244.2 |

* cited by examiner

*Primary Examiner*—Jefferson Evans
(74) *Attorney, Agent, or Firm*—Intellectual Property Law Offices of Joel Voetzke, APC

(57) ABSTRACT

For controlling $1^{st}$ and $2^{nd}$ torsion characteristics in a disk drive suspension, a disk drive suspension is provided having a beam portion with edge rails extending along its edge regions, the edge rails are locally varied substantially identically between lesser and greater heights along their lengths, the beam portion having a central region increasingly extending above or below the plane of excitation in inverse response to the edge rails increasingly or decreasingly extending above the plane of excitation. The inverse relation of the beam portion central region and the rail heights relative to the plane of excitation tends to offset in at least part changes in the balance of the suspension upper and lower inertia components from changes in the geometry of said suspension.

21 Claims, 4 Drawing Sheets

DISK DRIVE SUSPENSION WITH 1$^{ST}$ AND 2$^{ND}$ TORSION CONTROL THROUGH RAIL HEIGHT VARIATION AND OFFSETTING BEAM PORTION DEFLECTION

CROSS-REFERENCE TO RELATED APPLICATIONS

This application claims the benefit of U.S. Provisional Application Ser. No. 60/678,043, filed May 4, 2005.

BACKGROUND OF THE INVENTION

1. Field of the Invention

The present invention relates to disk drive suspensions, and more particularly, to disk drive suspensions having controlled 1$^{st}$ and 2$^{nd}$ torsion gains through variations in edge rail geometry. A disk drive suspension is provided having a beam portion with edge rails extending along its edge regions and a plane of excitation extending between the suspension base portion and the suspension dimple. The edge rails are locally varied substantially identically between lesser and greater heights along their lengths to control 1$^{st}$ and 2$^{nd}$ torsion characteristics. A beam portion central region increasingly extends above or below the plane of excitation in inverse response to the edge rails increasingly or decreasingly extending above the plane of excitation. The inverse extending relation of the beam portion central region and the rail heights relative to the plane of excitation tends to offset in at least part changes in the balance of the suspension upper and lower inertia components from changes in the geometry of said suspension. Control of 1$^{st}$ and 2$^{nd}$ torsion characteristics is achieved beyond that available by spring portion modification, and inertia component balance above and below the plane of excitation is maintained by complementary, offsetting deflections of the beam portion.

2. Background Art

A beam portion carrying a flexure and slider in operative association with a disk, is arranged to apply vertical force on the slider to counteract the force on the slider developed by an air bearing generated at the surface of the disk. A predetermined flying height allows a magnetic head adjacent a trailing edge of the slider to read and write on the disk. The suspension carries the slider from disk track to disk track to write magnetic information, and to retrieve or read magnetic information from a written track, in an action termed "seeking." Seeking is done at certain velocities and with certain accelerations of the suspension and slider. Dynamic characteristics of the suspension beam can introduce some errors in the finding of, and settling opposite, a track. Suspensions also tend to vibrate while seeking, in bending, torsion and sway modes and in any direction in space. For each mode of vibrations there is a resonance gain associated with the vibration frequency.

BRIEF SUMMARY OF THE INVENTION

These resonance gains can be reduced or controlled by managing the inertia of the suspension (load beam and slider), the inertia being equal to the product of the load beam and slider mass center and the distance of the mass center from axis of rotation. A load beam is a cantilever structure with a spring section near the mount plate end. During normal operation, the suspension and slider (also termed a head gimbal assembly or HGA) flies over a spinning disk. The slider air bearing surfaces and disk develop an air film, or air bearing, that keeps the suspension from touching the disk. The air bearing cushion of air acts like a spring.

The metal spring portion of the suspension is formed in such a way that the overall inertia of the head gimbal assembly is minimized; overall or system inertia is reduced by balancing its components of the upper inertia and the lower inertia (relative to the plane of the suspension system excitation). A proper forming of the spring can reduce or minimize 1$^{st}$ torsion as well as 2$^{nd}$ torsion gains of the suspension. Newer, advanced suspensions are very small and complete optimization of the all the modes of vibration with only the metal spring portion is difficult or impossible given increasingly stringent space limitations. The present invention redistributes the upper and lower inertia, corresponding to the balance of inertia between the top and bottom segments of a head gimbal assembly, divided at the plane of excitation, and controlling, indeed optimizing 1$^{st}$ and 2$^{nd}$ torsion modes simultaneously.

Advanced suspensions are designed for higher 1$^{st}$ and 2$^{nd}$ torsional frequencies that are achieved by making the length of the spring area very short. To optimize the 1$^{st}$ and 2$^{nd}$ torsional gains, the spring area is formed to generate vertical force from the bending of the load beam and minimize torsional gains. The increasingly employed short spring lengths leave little opportunity to optimize the 1$^{st}$ torsional gain.

In accordance with the invention, a different solution is provided involving modifying the geometry of the load beam portion. Edge rails are typically used on beam portions to stiffen the beam. Such rails have typically been of a constant rail height or a regular diminution of height as in a tapered rail where rail height changes as a function of length.

In the invention, the beam portion rails are given variable heights, such as greater height at the rail end portions and lower height at the rail intermediate portion, or lesser height at the rail end portions and greater height at the rail intermediate portions, or a variation of these such as multiple patterns of greater and lesser heights, or only one end portion varying relative to the intermediate portion provided the edge rail exposed edge between the end and intermediate portions is curvilinear, and the rails of a contoured shape to enable optimum resonance gains. The invention variable shape beam portions redistribute the inertia for top and bottom segment of the load beam and slider assembly divided at the plane of excitation.

Further, the variable height of the rails engender upon bending a reshaping of the formed load beam. When the variable rails are formed out of the plane of the beam portion (a bend close to 80 degrees) the beam portion will assume a concave or convex shape determined by the profile of the edge rail as hereinafter explained. The concave or convex beam portion shape, opposite to the change in edge rail profile, balances the upper and lower inertia components of the load beam at the plane of excitation. Thus, by varying locally the rail height and thereafter bending the rail from the plane of the beam portion a natural sag is formed in the beam portion central region. This effects a mass and inertia component redistribution inverse between the rail variations and the beam portion sag and resonance gains are reduced and optimized, i.e. controlled.

In sum advantages of variable shaped load beam include:

1) Stiffening the load beam as a function of load beam length. This allows mass and inertia control the changing of frequencies and gains for the 1$^{st}$ and 2nd torsional modes;

2) Using variable rail heights and contours produces natural sag; adding rail height will produce a concave shape or "sag" in the beam portion central region, while taking away rail height produces the opposite effect;

3) Tighter distribution of "sag" angles for a given rail contour; and,

4) "Sag" forming by separate mechanical means is not required, eliminating a process step.

It is an object of the invention, therefore, to provide an improved disk drive suspension. It is a further object to provide apparatus and method for disk drive suspensions having variable height edge rails, inherent beam portion sag, and minimized $1^{st}$ and $2^{nd}$ torsion values. Another object is to provide a suspension having varying height edge rails along their lengths to enable torsion characteristics to be controlled. A further object is to provide a balance of upper and lower inertia components for minimum inertia overall in a suspension by offsetting mass changes from rail modification with inverse modifications of the beam portion mass distribution.

These and other objects of the invention to become apparent hereinafter are realized in a disk drive suspension comprising a base portion, a spring portion and a generally planar beam portion for supporting a flexure and a slider in gimballing relation with the beam portion about a dimple and for operative association with a disk, the suspension having a mass providing an inertia that is in use divided into an upper inertia component and a lower inertia component at a plane of excitation extending between the base portion and the dimple, the beam portion being locally deflected out of its general plane to vary the distribution of suspension mass in the upper inertia component and the lower inertia component in inertia balance adjusting relation.

In this and like embodiments, typically, the beam portion has a lower side facing the slider and an oppositely facing upper side, the beam portion local deflection being toward the upper side in upper inertia component increasing relation, or, the beam portion has a lower side facing the slider and an oppositely facing upper side, the beam portion local deflection being toward the lower side in lower inertia component increasing relation, the planar beam portion has a central region between left and right edge regions, and left and right edge rails bent from the planar base portion at the left and right edge regions in base portion center region deflecting relation, the beam left and right edge rails are varied in height along their lengths to correspondingly locally vary the amount and distribution of the suspension mass, the beam left and right edge rails have proximate and distal end portions and an intermediate portion therebetween, the intermediate portion being reduced in height relative to either or both of the end portions, the planar beam portion central region is bracketed by the edge rail intermediate portions, the central region being deflected upward to between the edge rail intermediate portions to increase the upper inertia component in offsetting relation to lessening of the upper inertia component by the reduction in height of the rail intermediate portions, and the central region is deflected upward by bending the edge rails from the general plane of the beam portion with the edge rail intermediate portions reduced in height.

Alternately in this and other embodiments, typically, the beam left and right edge rails have proximate and distal end portions and an intermediate portion therebetween, at least one of the end portions being reduced in height relative to the height of the rail intermediate portion, the planar beam portion central region is deflected downward from the general plane of the beam portion at the edge rail an intermediate portions to increase the lower inertia component in offsetting relation to an increase in the upper inertia component from the height of the rail intermediate portions, and the central region is deflected downward by bending the edge rails from the general plane of the beam portion with the edge rail intermediate end portions reduced in height relative to the edge rail an intermediate portions.

In a further embodiment, the invention provides a disk drive suspension comprising a base portion, a spring portion and a beam portion, and a slider in gimballing relation with the beam portion for operative association with a disk, the beam portion having left and right edge rails whose an intermediate portion is increased or decreased in height from at least their distal end portions, the beam portion central region being deflected oppositely from the height increase or decrease.

In this and like embodiments, typically, the intermediate portion increase or decrease alters the balance of upper inertia component and lower inertia component in the suspension in use, the central region deflection acting to offset at least partially the alteration of upper and lower inertia balance, the beam left and right edge rails have proximate and distal end portions and an intermediate portion therebetween, the intermediate portion being reduced in height relative to either or both of the end portions, the suspension beam portion includes a planar central region bracketed by the edge rail intermediate portions, the central region being deflected upward to between the edge rail intermediate portions to increase the upper inertia component in offsetting relation to lessening of the upper inertia component by the reduction in height of the rail intermediate portions, and the central region is deflected upward by bending the edge rails from the general plane of the beam portion with the edge rail intermediate portions reduced in height.

Alternately, the beam left and right edge rails have proximate and distal end portions and an intermediate portion therebetween, at least one of the end portions being reduced in height relative to the height of the rail intermediate portion, the planar beam portion central region is deflected downward from the general plane of the beam portion at the edge rail intermediate portions to increase the lower inertia component in offsetting relation to an increase in the upper inertia component from the height of the rail intermediate portions, and the central region is deflected downward by bending the edge rails from the general plane of the beam portion with the edge rail end portions reduced in height relative to the edge rail intermediate portions.

In a further embodiment, the invention provides a disk drive suspension comprising a base portion, a spring portion and a beam portion for supporting a flexure and slider in gimballing relation with the flexure about a dimple and in operative association with a disk, the beam portion having left and right edge rails each having a length to extend along the edge regions of the beam portion, the edge rails locally varying substantially identically between lesser and greater heights along their lengths, the suspension having in use a plane of excitation extending between the base portion and the dimple, the beam portion having a central region increasingly extending above or below the plane of excitation in inverse response to the edge rails increasingly or decreasingly extending above the plane of excitation, whereby the inverse relation of the beam portion central region and the rail heights relative to the plane of excitation tends to offset in at least part changes in the balance of the suspension upper and lower inertia components from changes in the geometry of the suspension.

In its method aspects, the invention provides a method of controlling $1^{st}$ torsion and $2^{nd}$ torsion characteristics of a disk drive suspension beyond the spring area, including varying the height of edge rails on the suspension beam portion, and deflecting a central region of the beam portion in inverse relation to the edge rail height variations to substantially maintain the balance of upper inertia and lower inertia of the suspension about its plane of excitation against change from varying the height of the edge rails, and a method of manufacturing a disk drive suspension having controlled $1^{st}$ torsion and $2^{nd}$ torsion characteristics, including varying the height of edge rails on the suspension beam portion, and deflecting a central region of the beam portion in inverse relation to the edge rail height variations to substantially maintain the balance of upper inertia and lower inertia of the suspension about its plane of excitation against change from varying the height of the edge rails.

BRIEF DESCRIPTION OF THE SEVERAL VIEWS OF THE DRAWINGS

The invention will be further described in conjunction with the attached drawings in which.

DETAILED DESCRIPTION OF THE INVENTION

Figure 1:
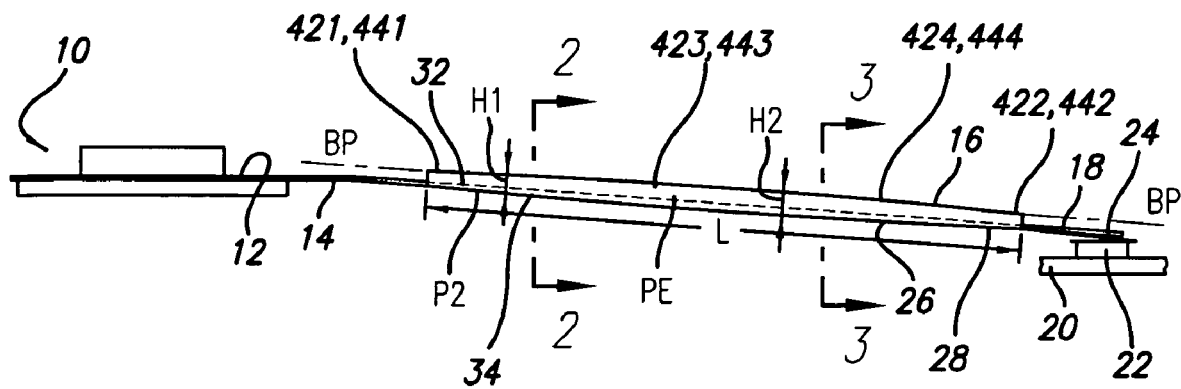
FIG. 1 is a side elevational view of the invention suspension with an increased height rail intermediate portion and a downward sag of the beam portion central region deflection.

With reference now to the drawings in detail, in FIGS. 1-6 the invention disk drive suspension is shown at 10 and comprises a base portion 12, a spring portion 14, and a beam portion 16 generally extending in a plane BP for supporting a flexure 18 and a slider 22 in gimballing relation with the beam portion about a dimple 24 for operative association with a disk 20. Suspension 10 has a mass providing an inertia in use divided into an upper inertia component and a lower inertia component at a plane of excitation PE extending between the base portion 12 and the dimple 24. Beam portion 16 is locally deflected at 26 out of its general plane BP to vary the distribution of suspension mass in the upper inertia component and the lower inertia component in suspension inertia balance adjusting relation.

Figure 2:
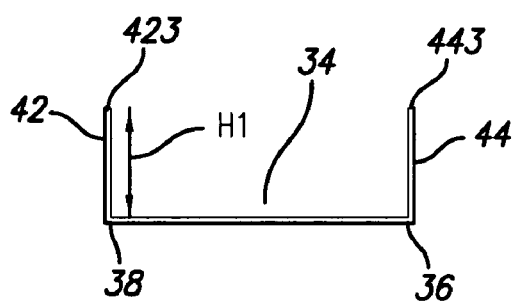
FIG. 2 is a view taken on line 2-2 in FIG. 1.
Figure 3:
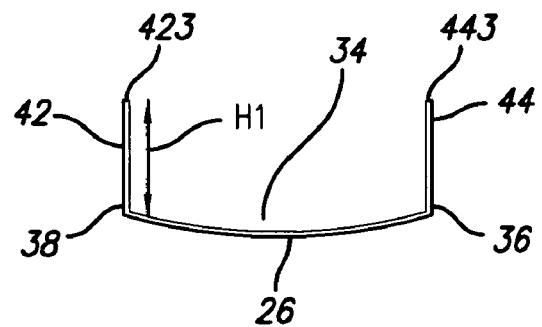
FIG. 3 is a view taken on line 3-3 in FIG. 1.
Figure 4:
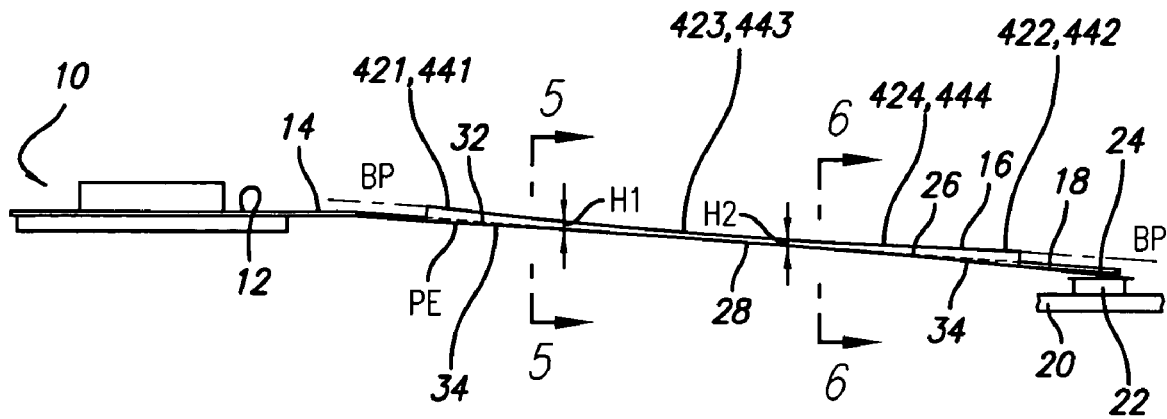
FIG. 4 is a side elevational view of the invention suspension with a decreased height rail intermediate portion and an upward sag of the beam portion central region deflection.
Figure 5:
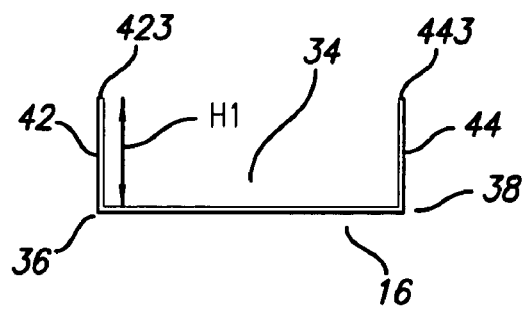
FIG. 5 is a view taken on line 5-5 in FIG. 4.
Figure 6:
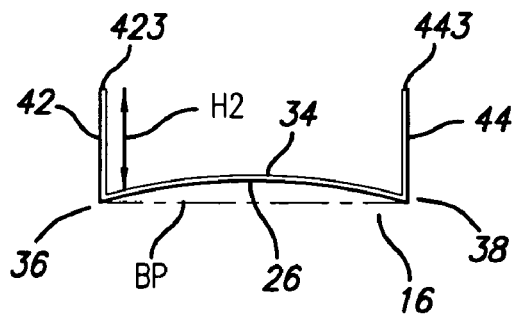
FIG. 6 is a view taken on line 6-6 in FIG. 4.

Beam portion 16 has a lower side 28 facing the slider 22 and an oppositely facing upper side 32. In FIGS. 4-6 beam portion local deflection 26 is shown as a shift of a beam central region 34 toward the beam upper side 32 in upper inertia component increasing relation. In FIGS. 1-3 the beam portion local deflection 26 is shown as a shift of beam central region 34 toward the beam lower side 28 in lower inertia component increasing relation.

In general, the generally planar beam portion 16 has its central region 34 initially between left and right edge regions 36, 38. Left and right edge rails 42, 44 are bent from the planar beam portion 16 at the left and right edge regions 36, 38 in beam portion center region 34 deflecting relation, as hereinafter explained.

Left and right edge rails 42, 44 are varied in height along their lengths, which locally changes their mass and the distribution of mass on the beam portion 16, to correspondingly locally vary the amount and distribution of the suspension mass. Left and right edge rails 42, 44 have proximate end portions 421, 441 and distal end portions 422, 442 and respective intermediate (e.g. center) portions 423, 443 therebetween.

Figure 7:
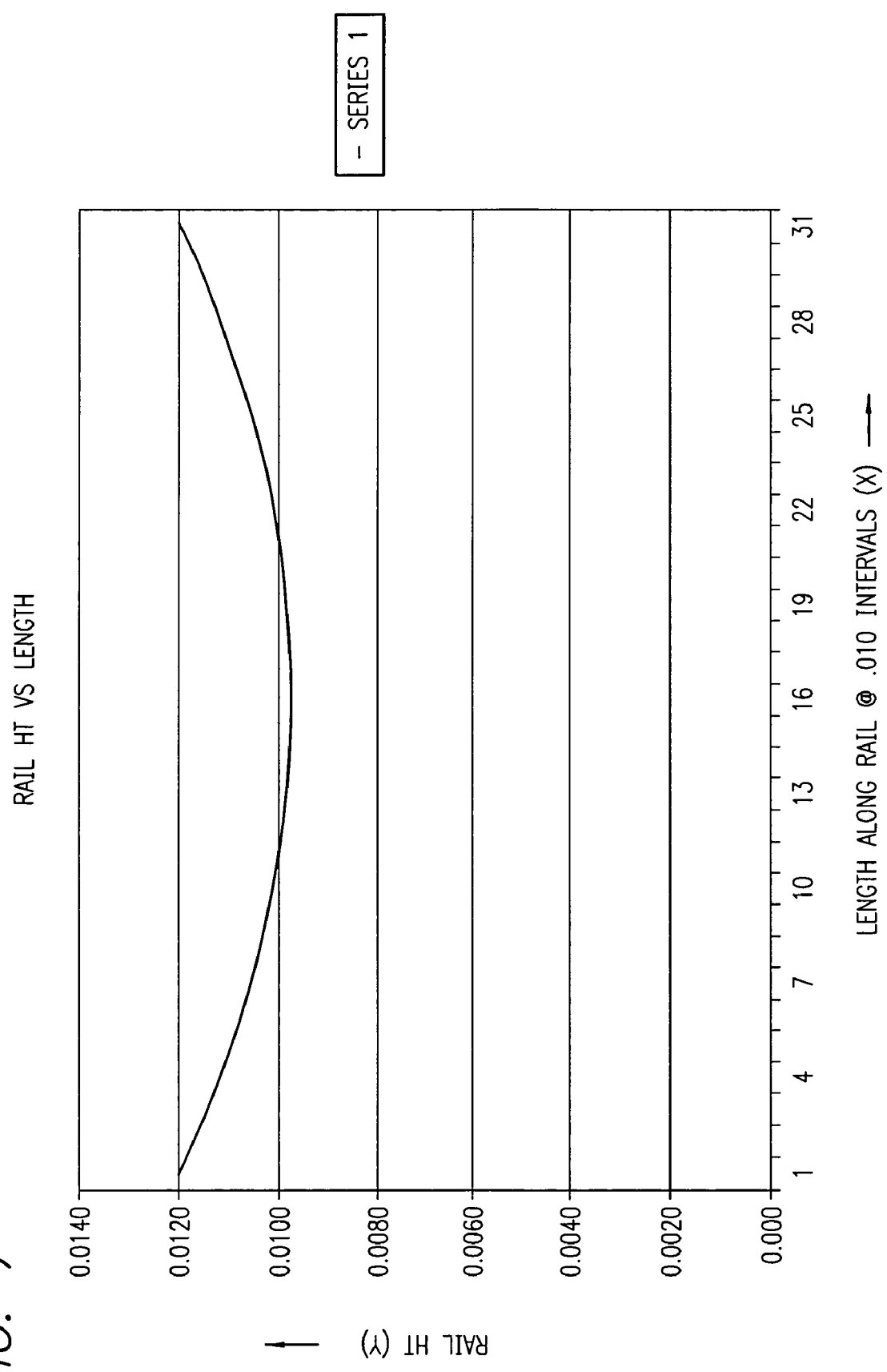
FIG. 7 is a plot of increased rail intermediate portion height vs. rail length; and, FIG. 8 is a plot of increased rail end portion heights vs. rail length.
Figure 8:
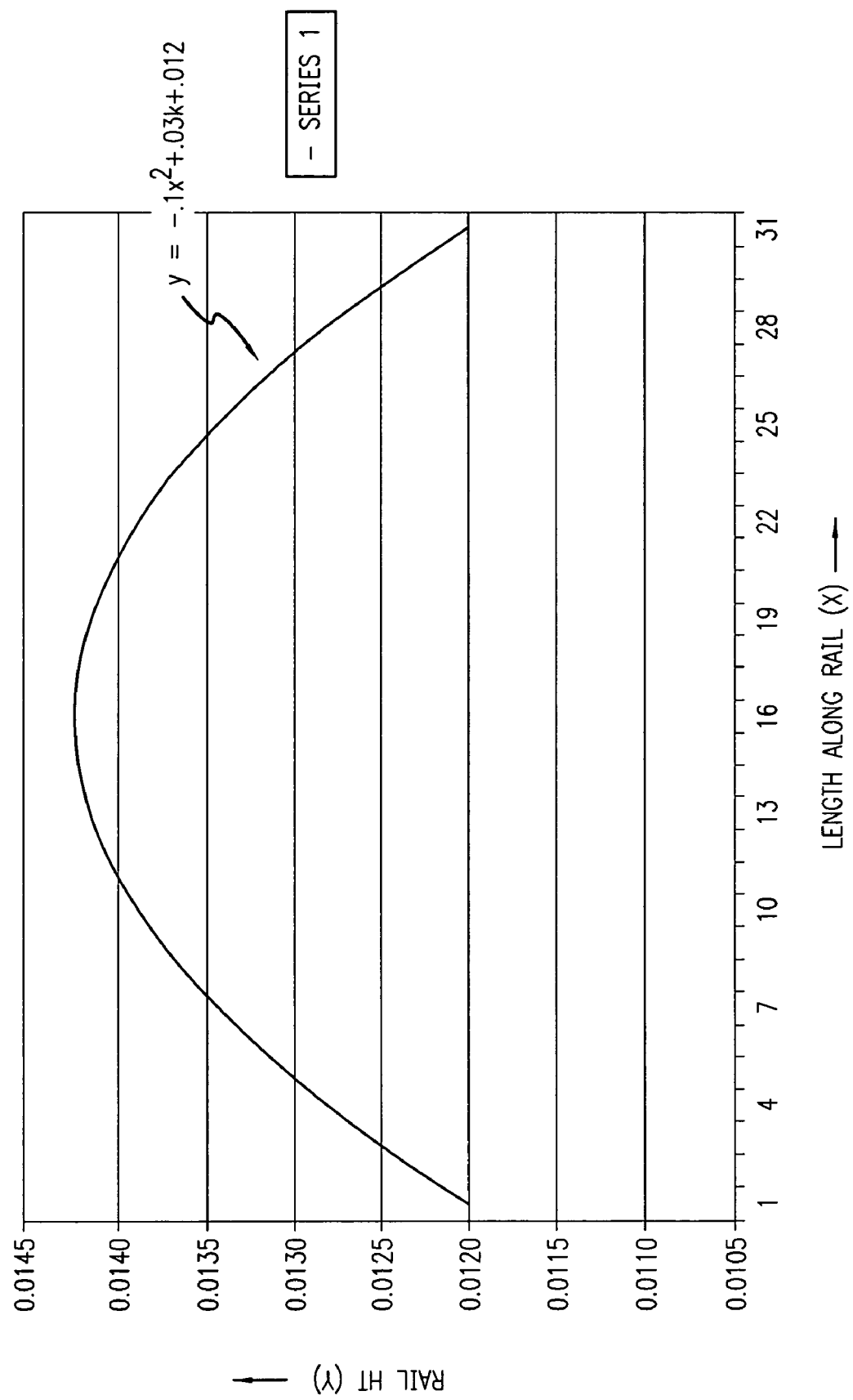

In FIGS. 4-6, the edge rail intermediate portions 423, 443 are shown reduced in height relative to both of the end portions 421, 422 and 441, 442 along respective smooth curves 424, 444, (see FIG. 8) so that the planar beam portion central region 34 is bracketed by the edge rail intermediate portions. Illustrating one embodiment, beam portion central region 34 is shown in FIGS. 4 and 6 deflected upward (out of plane BP) to have local deflection 26 be located in substantial part between the edge rail intermediate portions 423, 443. This localized shift of suspension mass increases the upper inertia component. The increase in upper inertia component offsets partially (less than 100%), fully (100%), or more than fully (more than 100%) the lessening of the upper inertia component resultant from reducing the height of the edge rail intermediate portions 423, 443. See FIG. 7. Where the central region 34 is deflected upward by the act of bending the edge rails 42, 44 from the general plane BP of the beam portion 16 with the edge rail intermediate portions 423, 443 reduced in height, as may occur, an added step of deflecting the central region during manufacture is obviated.

In the FIGS. 1-3 embodiment the left and right edge rails proximate and distal end portions 421, 441, 422, 442 have rail intermediate portions 423, 443 therebetween reduced in height relative to the height of the rail intermediate portion. The planar beam portion central region 34 is, in this embodiment, deflected downward from the general plane BP of the beam portion 16 at the edge rail intermediate portions 423, 443 to form local deflection 26 located so as to increase the lower inertia component in offsetting relation to an increase in the upper inertia component from the height of the rail end portions 421, 441, 422, 442. This localized shift of suspension mass increases the lower inertia component. The increase in lower inertia component offsets partially (less than 100%), fully (100%), or more than fully (more than 100%) the increase in the upper inertia component resultant from increasing the height of the edge rail end portions 421, 441, 422, 442 relative to the edge rail intermediate portions 423, 443. Where the beam portion central region 34 is deflected downward by the act of bending the edge rails 42, 44 from the general plane BP of the beam portion 16 with the edge rail end portions 421, 441, 422, 442 relatively increased in height over the intermediate portions 423, 443, as may occur, an added step of deflecting the central region during manufacture is obviated The invention provides a disk drive suspension 10 comprising a base portion 12, a spring portion 14 and a beam portion 16, and a slider 22 in gimballing relation with the beam portion for operative association with a disk 20, the beam portion having left and right edge rails 42, 44 whose intermediate portions 423, 443 are each increased or decreased in height from at least their distal end portions 422, 442, the beam portion central region 34 being deflected oppositely from the height increase or decrease to form local deflection 26. In this embodiment, the rail intermediate portion 423, 443 increase or decrease alters the balance of upper inertia component and lower inertia component in the suspension in use, the central region 34 deflection 26 acting to offset at least partially the alteration of upper and lower inertia balance. Beam left and right edge rails 42, 44 have proximate and distal end portions 421, 441, 422, 442 and intermediate portions 423, 443 therebetween, the intermediate portions being reduced in height relative to either or both of the end portions, while the suspension beam portion 16 includes a planar central region 34 bracketed by the edge rail intermediate portions 423, 443, the central region being deflected at 26 upward to between the edge rail intermediate portions to increase the upper inertia component in offsetting relation to lessening of the upper inertia component by the reduction in height of the rail intermediate portions. Alternately, at least one of the end portions 421, 441, 422, 442 is reduced in height relative to the height of the rail intermediate portions 423, 443, the planar beam portion central region 34 is deflected downward from the general plane BP of the beam portion 16 at the edge rail intermediate portions, at 26, to increase the lower inertia component in offsetting relation to an increase in the upper inertia component from the height of the rail intermediate portions.

In a further embodiment, a disk drive suspension 10 is provided comprising a base portion 12, a spring portion 14 and a beam portion 16 for supporting a flexure 18 and slider 22 in gimballing relation with the flexure about a dimple 24 and in operative association with a disk 20, the beam portion having left and right edge rails 42, 44 each having a length L to extend along the edge regions 36, 38 of the beam portion, the edge rails locally varying substantially identically between lesser and greater (or vice-versa) heights H1, H2 along their lengths, the suspension having in use a plane of excitation PE extending between the base portion and the dimple, the beam portion having a central region 34 increasingly extending above or below the plane of excitation in inverse response to the edge rails increasingly or decreasingly extending above the plane of excitation, whereby the inverse relation of the beam portion central region and the rail heights relative to the plane of excitation tends to offset in at least part changes in the balance of the suspension upper and lower inertia components from changes in the geometry of the suspension.

The invention method of controlling $1^{st}$ torsion and $2^{nd}$ torsion characteristics of a disk drive suspension beyond the spring area, includes varying the height H1, H2 of edge rails 42, 44 on the suspension beam portion 16, and deflecting a central region 34 of the beam portion in inverse relation to the edge rail height variations to substantially maintain the balance of upper inertia and lower inertia of the suspension about its plane of excitation PE against change from varying the height of the edge rails.

The invention method of manufacturing a disk drive suspension 10 having controlled $1^{st}$ torsion and $2^{nd}$ torsion characteristics includes varying the height H1, H2 of edge rails 42, 44 on the suspension beam portion 16, and deflecting a central region 34 of the beam portion in inverse relation to the edge rail height variations to substantially maintain the balance of upper inertia and lower inertia of the suspension about its plane of excitation PE against change from varying the height of the edge rails.

The invention thus provides an improved apparatus and method comprising a disk drive suspension having variable height edge rails, inherent beam portion positive and negative sag, and minimized $1^{st}$ and $2^{nd}$ torsion values through the use of varying height edge rails along their lengths. Suspension upper and lower inertia components altered by the rail height variations are compensated for, in order to maintain minimum inertia overall in the suspension, by offsetting suspension mass distribution changes from rail modification with inversely acting modifications of the beam portion mass distribution.

The foregoing objects are thus met.

We claim:

1. A disk drive suspension comprising a base portion, a spring portion and a generally planar beam portion for supporting a flexure and a slider in gimballing relation with said beam portion about a dimple and for operative association with a disk, said suspension having a mass providing an inertia in use divided into an upper inertia component and a lower inertia component at a plane of excitation extending between said base portion and said dimple, said beam portion being locally deflected out of its general plane to vary the distribution of suspension mass in said upper inertia component and said lower inertia component in inertia balance adjusting relation, said beam left and right edge rails being varied in height along their lengths to correspondingly locally vary the amount and distribution of said suspension mass.

2. The disk drive suspension according to claim 1, in which said beam portion has a lower side facing said slider and an oppositely facing upper side, said beam portion local deflection being toward said upper side in upper inertia component increasing relation.

3. The disk drive suspension according to claim 1, in which said beam portion has a lower side facing said slider and an oppositely facing upper side, said beam portion local deflection being toward said lower side in lower inertia component increasing relation.

4. The disk drive suspension according to claim 1, in which said planar beam portion has a central region between left and right edge regions, and left and right edge rails bent from said planar beam portion at said left and right edge regions in base portion center region deflecting relation.

5. The disk drive suspension according to claim 1, in which said beam left and right edge rails have proximate and distal end portions and an intermediate portion therebetween, said intermediate portion being reduced in height relative to either or both of said end portions.

6. The disk drive suspension according to claim 5, in which said planar beam portion central region is bracketed by said edge rail intermediate portions, said central region being deflected upward to between said edge rail intermediate portions to increase said upper inertia component in offsetting relation to lessening of said upper inertia component by said reduction in height of said rail intermediate portions.

7. The disk drive suspension according to claim 6, in which said central region is deflected upward by bending said edge rails from the general plane of said beam portion with said edge rail intermediate portions reduced in height.

8. The disk drive suspension according to claim 1, in which said beam left and right edge rails have proximate and distal end portions and an intermediate portion therebetween, at least one of said end portions being reduced in height relative to the height of said rail intermediate portion.

9. The disk drive suspension according to claim 8, in which said planar beam portion central region is deflected downward from the general plane of said beam portion at said edge rail intermediate portions to increase said lower inertia component in offsetting relation to an increase in said upper inertia component from the height of said rail intermediate portions.

10. The disk drive suspension according to claim 9, in which said central region is deflected downward by bending said edge rails from the general plane of said beam portion with said edge rail intermediate portions reduced in height relative to said edge rail central portions.

11. A disk drive suspension comprising a base portion, a spring portion and a beam portion, and a slider in gimballing relation with said beam portion for operative association with a disk, said beam portion having left and right edge rails whose central portion is increased or decreased in height from at least their distal end portions said, beam portion central region being deflected oppositely from said height increase or decrease.

12. The disk drive suspension according to claim 11, in which said central portion increase or decrease alters the balance of upper inertia component and lower inertia component in said suspension in use, said central region deflection acting to offset at least partially said alteration of upper and lower inertia balance.

13. The disk drive suspension according to claim 12, in which said beam left and right edge rails have proximate and distal end portions and an intermediate portion therebetween, said intermediate portion being reduced in height relative to either or both of said end portions.

14. The disk drive suspension according to claim 13, in which said suspension beam portion includes a planar central region bracketed by said edge rail intermediate portions, said central region being deflected upward to between said edge rail intermediate portions to increase said upper inertia component in offsetting relation to lessening of said upper inertia component by said reduction in height of said rail intermediate portions.

15. The disk drive suspension according to claim 14, in which said central region is deflected upward by bending said edge rails from the general plane of said beam portion with said edge rail intermediate portions reduced in height.

16. The disk drive suspension according to claim 12, in which said beam left and right edge rails have proximate and distal end portions and an intermediate portion therebetween, at least one of said end portions being reduced in height relative to the height of said rail intermediate portion.

17. The disk drive suspension according to claim 16, in which said planar beam portion central region is deflected downward from the general plane of said beam portion at said edge rail intermediate portions to increase said lower inertia component in offsetting relation to an increase in said upper inertia component from the height of said rail intermediate portions.

18. The disk drive suspension according to claim 17, in which said central region is deflected downward by bending said edge rails from the general plane of said beam portion with said edge rail intermediate portions reduced in height relative to said edge rail central portions.

19. A disk drive suspension comprising a base portion, a spring portion and a beam portion for supporting a flexure and slider in gimballing relation with said flexure about a dimple and in operative association with a disk, said beam portion having left and right edge rails each having a length to extend along the edge regions of said beam portion, said edge rails locally varying substantially identically between lesser and greater heights along their said lengths, said suspension having in use a plane of excitation extending between said base portion and said dimple, said beam portion having a central region increasingly extending above or below said plane of excitation in inverse response to said edge rails increasingly or decreasingly extending above said plane of excitation, whereby the inverse relation of said beam portion central region and said rail heights relative to said plane of excitation tends to offset in at least part changes in the balance of the suspension upper and lower inertia components from changes in the geometry of said suspension.

20. A method of controlling $1^{st}$ torsion and $2^{nd}$ torsion characteristics of a disk drive suspension beyond the spring area, including varying the height of edge rails on the suspension beam portion, and deflecting a central region of said beam portion in inverse relation to said edge rail height variations to substantially maintain the balance of upper inertia and lower inertia of the suspension about its plane of excitation against change from varying the height of the edge rails.

21. A method of manufacturing a disk drive suspension having controlled $1^{st}$ torsion and $2^{nd}$ torsion characteristics, including varying the height of edge rails on the suspension beam portion, and deflecting a central region of said beam portion in inverse relation to said edge rail height variations to substantially maintain the balance of upper inertia and lower inertia of the suspension about its plane of excitation against change from varying the height of the edge rails.

* * * * *

UNITED STATES PATENT AND TRADEMARK OFFICE
CERTIFICATE OF CORRECTION

PATENT NO. : 7,542,241 B1  Page 1 of 1
APPLICATION NO. : 11/407674
DATED : June 2, 2009
INVENTOR(S) : Amanullah Khan and Harry Wong It is certified that error appears in the above-identified patent and that said Letters Patent is hereby corrected as shown below:

In claim 11, column 9, line 1, delete "said," and insert -- , said --.

Signed and Sealed this

Seventh Day of July, 2009

JOHN DOLL
*Acting Director of the United States Patent and Trademark Office*